United States Patent [19]

Shirakura et al.

[11] Patent Number: 5,088,244
[45] Date of Patent: Feb. 18, 1992

[54] MACHINING METHOD FOR MEMBER INCLUDED SCREW-SHAPED PORTION

[75] Inventors: Takeo Shirakura, Aichi; Fumitoshi Terasaki, Kani; Takashi Nishimoto, Inazawa, all of Japan

[73] Assignee: Okuma Machinery Works Ltd., Nagoya, Japan

[21] Appl. No.: 702,106

[22] Filed: May 15, 1991

Related U.S. Application Data

[63] Continuation of Ser. No. 365,009, Jun. 9, 1989, abandoned.

Foreign Application Priority Data

Jun. 13, 1988 [JP] Japan .................................. 63-144987

[51] Int. Cl.$^5$ .............................................. B24B 1/00
[52] U.S. Cl. ........................................ 51/288; 51/325; 409/66
[58] Field of Search ................ 409/66, 74, 76, 77, 409/131, 132; 408/180; 51/95 TG, 2 F, 43, 288, 325, 287

[56] References Cited

U.S. PATENT DOCUMENTS

| | | | |
|---|---|---|---|
| 2,451,497 | 10/1948 | Kratchman | 409/74 |
| 3,486,413 | 12/1968 | Burgsmuller | |
| 3,966,348 | 6/1976 | Burgsmuller | 408/180 |
| 4,125,057 | 11/1978 | Cox | 82/1.4 |
| 4,274,231 | 6/1981 | Verega | 51/325 X |
| 4,860,501 | 8/1989 | Belthle | 51/288 |

FOREIGN PATENT DOCUMENTS

| | | |
|---|---|---|
| 3438661C2 | 9/1986 | Fed. Rep. of Germany . |
| 0137495 | 11/1978 | Japan ........................ 51/2 F |
| 334829 | 9/1930 | United Kingdom . |
| 1057420 | 2/1967 | United Kingdom . |

*Primary Examiner*—Z. R. Bilinsky
*Attorney, Agent, or Firm*—Darby & Darby

[57] ABSTRACT

A method of machining a member included a screw-shaped portion which is used when the member is ground at the screw-shaped portion by means of a machine tool, in particular, a grinder. A configuration of the tool that projects corresponding to the thread-groove configuration on a section normal to the axis of the screw-shaped portion to be machined is prepared. The axis of the tool is positioned in parallel with the axis of the screw-shaped portion to be machined, and the relevant surface of the screw-shaped portion is machined by moving the tool relative to the screw-shaped portion while their axes are being kept in parallel with each other. According to the present invention, the lead of a small-diameter, deep-grooved female screw-shaped portion may be able to be machined. In addition, an ordinary NC machine tool can be used to machine leads of screw-shaped portions simply by making changes in the NC program.

3 Claims, 12 Drawing Sheets

FIG. 7B

S24

$$Td = -\frac{2M\sin\alpha}{D^2} - \frac{(X_D+F)N}{M+F}$$

$$\begin{cases} Xd = \frac{1}{2}(\cos\tau - D\,Td\sin\tau) \\ Yd = \frac{1}{2}(\sin\tau + DTd\cdot\cos\tau) \end{cases}$$

$$\begin{cases} Q_1 = \left(\frac{-1}{2(M+F)} - \frac{(X_D+F)^2}{2(M+F)^3}\right)N \\ Q_2 = \left(\frac{X_D+F}{M+F}\right)\left(\frac{\sin\alpha}{D^2}\right) \\ Q_3 = \frac{4(M+F)\sin\alpha}{D^3} \end{cases}$$

$$Td_2 = Q_1 + 2Q_2 + Q_3$$

$$\begin{cases} Xd_2 = -\frac{Td\sin\tau}{2} - Yd\,Td - \frac{DTd_2\sin\tau}{2} \\ Yd_2 = \frac{Td\cos\tau}{2} + Xd\,Td + \frac{DTd_2\cos\tau}{2} \end{cases}$$

$$\rho = \frac{(Xd^2 + Yd^2)^{\frac{3}{2}}}{Xd_2\,Yd - Xd\,Yd_2}$$

$$K_T = \tan^{-1}\left(-\frac{Xd}{Yd}\right) \quad (K_T \geq 0)$$

$$K_T = \tan^{-1}\left(-\frac{Xd}{Yd}\right) + \pi \quad (K_T < 0)$$

$$\delta = K_T - \tau$$

$$P = \sqrt{(\rho \sin \delta)^2 + \left(\frac{D}{2} - \rho \cos \delta\right)^2}$$

$$Dmax = D_0 + 2(Dx - \rho)$$
$$Wmax = 2Dx$$

S26

OUTPUT TO CRT

Dmax : INITIAL WHEEL DIAMETER

Wmax : INITIAL WHEEL WIDTH

RETURN

FIG. 8A (PR 2) — DRESSING DATA CALCULATING PROGRAM

S31 — READ DATA
- L : LEAD
- R : GOTHIC ARC RADIUS
- F : GOTHIC ARC OFFSET VALUE
- Do : SCREW DIAMETER
- Dmax : INITIAL WHEEL DIAMETER S32:
$$\alpha = \tan^{-1}\left(\frac{L}{\pi D_o}\right)$$
$$D_x = \sqrt{R^2 - F^2} - F$$
$$P = \frac{D_o}{2} + D_x - \frac{D_{max}}{2}$$

S33:
J = 180
Ds = 10000

S34:
$\theta_2(J), X_2(J)$
$\theta_3(J), X_3(J), Z_3(J)$ (5)

S35: REPEAT FROM I=0 TO I=J (3)

$$D = D_0 + 2D_x \cos\left(\frac{\pi I}{2J}\right)$$

$$X_D = \frac{1}{2}(D - D_0)$$

$$\begin{cases} M = \sqrt{R^2 - (X_D + F)^2} - F \\ N = \frac{\sin\alpha}{D} + \frac{\pi}{L}\cos\alpha \end{cases}$$

$$\tau = 2MN$$

S37

$$Td = -\frac{2M\sin\alpha}{D^2} - \frac{(X_D + F)N}{M + F}$$

$$\begin{cases} Xd = \frac{1}{2}(\cos\tau - DTd\sin\tau) \\ Yd = \frac{1}{2}(\sin\tau + DTd\cos\tau) \end{cases}$$

$$\begin{cases} K_T = \tan^{-1}\left(-\frac{Xd}{Yd}\right) & (K_T \geq 0) \\ K_T = \tan^{-1}\left(-\frac{Xd}{Yd}\right) + \pi & (K_T < 0) \end{cases}$$

$$\delta = K_T - \tau$$

④

MACHINING METHOD FOR MEMBER INCLUDED SCREW-SHAPED PORTION

This is a continuation of application Ser. No. 365,009, filed June 9, 1989, now abandoned.

BACKGROUND OF THE INVENTION

1. Field of the Invention

The present invention relates to a method of machining a member included a screw-shaped portion, which is used when the member is ground by means of a machine tool, in particular, a grinder.

2. Description of the Related Art

When the lead of a screw is being machined by grinding, it has conventionally been necessary to tilt the wheel spindle in accordance with the lead angle, as shown in FIG. 10. It has also been necessary to tilt the wheel dressing device in a similar manner. The grinding therefore has been performed using a screw grinder which is exclusively prepared for this purpose and which has a tilting mechanism that makes it possible to meet the above-stated requirements.

However, even when a screw grinder having a tilting mechanism is used, it has been impossible to machine a female screw by grinding it if the screw has a small diameter and, simultaneously, if a deep grooving is desired, because, in such cases, the wheel quill and the object of machining tend to interfere with each other. In addition, since the level of the center of the wheel varies depending on the length of the wheel quill used, the vertical position of the center must be adjusted each time a quill of a different length is to be used. Furthermore, the tilting mechanism per se is complicated, thereby rendering the entire grinder expensive. Thus, the prior art has encountered various problems such as those described above.

SUMMARY OF THE INVENTION

Accordingly, it is an object of the present invention to provide a machining method for a member included a screw-shaped portion, which, during machining, enables deep grooving of a small-diameter in a screw-shaped portion without the need for tilting the axis of the tool used.

Another object of the present invention is to provide a machining method for a member included a screw-shaped portion, which enables machining without requiring the use of a screw grinder exclusively prepared for this purpose, and which is applicable to grinding machining as well.

To these ends, a method of machining a member included a screw-shaped portion in accordance with the present invention comprises the steps of: preparing a configuration of a tool that projects corresponding to the thread-groove configuration of the screw-shaped portion of the member to be machined that is on a section normal to the axis of the screw-shaped portion; positioning the axis of the tool in parallel with the axis of the screw-shaped portion to be machined; and machining the relevant surface of the screw-shaped portion by moving the tool relative to the screw-shaped portion while the axis of the tool is being kept in parallel with the axis of the screw-shaped portion.

According to the present invention, a female screw-shaped portion of the member is machined in the following manner. Various specifications which are necessary to the machining of the female screw-shaped portion to be ground are input to the arithmetic section of an NC unit. Programs are executed in such a manner that data on dimensions of the wheel required, i.e., the diameter and the width thereof are displayed. Subsequently, wheel, dressing data is calculated, then stored into a memory, and a view of a wheel dressing locus is displayed by a display. A wheel dressing device is controlled on the basis of the displayed data so that the wheel is dressed into a configuration projecting in correspondence with the thread-groove configuration on a section normal to the axis of the screw-shaped portion. The member is ground by securing a necessary depth of cut and by feeding the wheel in accordance with the lead of the screw-shaped portion, while the axis of the wheel is kept in parallel with the axis of the screw-shaped portion.

DETAILED DESCRIPTION OF THE PREFERRED EMBODIMENT

Figure 1:
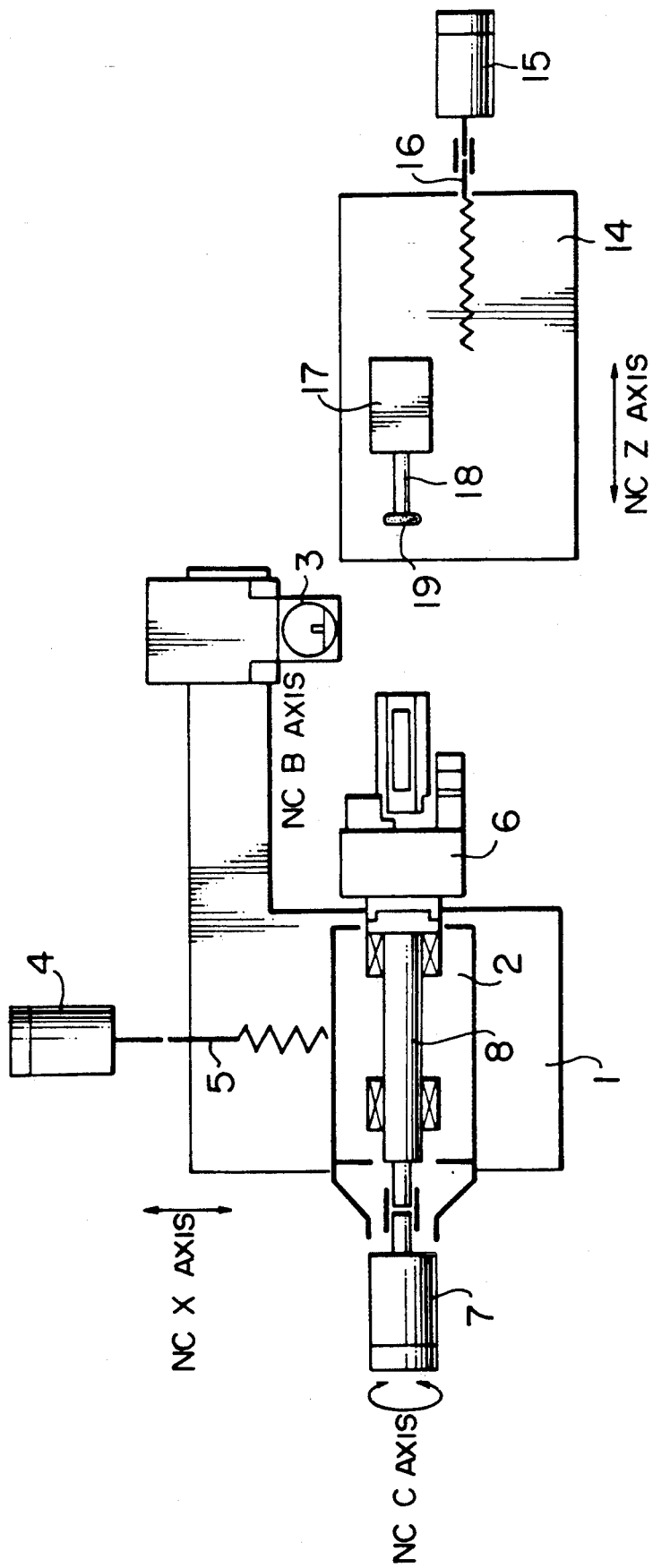
FIG. 1 is a view showing a drive system of an NC grinder.
Figure 2:
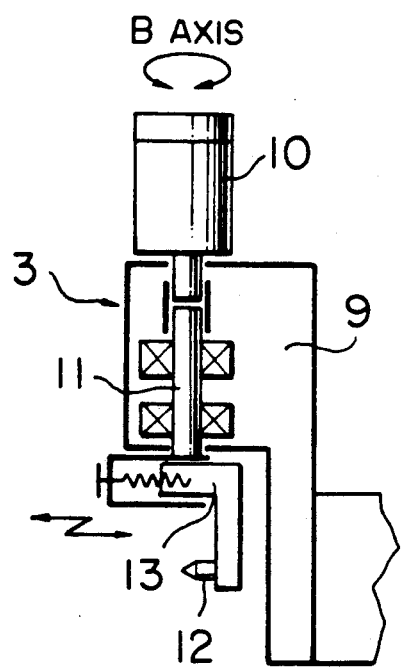
FIG. 2 is a view showing a dresser section of the grinder.
Figure 3:
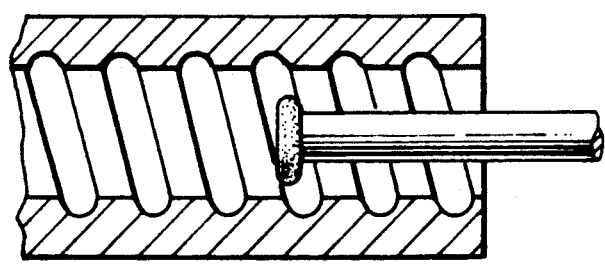
FIG. 3 is a view showing a state in which a female screw-shaped portion is being ground by the method of the present invention.

Referring to FIG. 1 showing various elements of a grinder and FIG. 2 showing a wheel dressing device, a cross slide 1 is disposed on the left side of a bed (not shown) of the grinder in such a manner as to be movable in the direction of the axis X (i.e., the direction of the depth of cut). Fixed onto the cross slide 1 are a head stock 2 and a wheel dressing device 3 having its axis extending in the direction normal to the axis of the head stock 2. The movement of the cross slide 1 is controlled through an X-axis feed screw 5 which can be driven by a servo-motor 4. The head stock 2 has a spindle 8 rotatably supported thereby via bearings. A chuck 6 is fitted on the front end of the spindle 8, the rear end of the spindle 8 being connected to a servo-motor 7 so as to be driven thereby about the axis C. The wheel dressing device 3 has a mounting stock 9 and a spindle 11 rotatably supported by the stock 9 via bearings. The rear end of the spindle 11 is connected to a servo-motor 10 so as to be driven thereby about the axis B. Provided on the front end of the spindle 11 is an L-shaped diamond holder 13 on which a diamond tool 12 is mounted in such a manner as to be directed in a direction normal to the central axis of the spindle 11. The diamond holder 13 is provided in such a manner that its position can be adjusted in the direction in which the diamond tool 12 is directed. On the right side of the bed, a table 14 is disposed in opposition to the head stock 2. The table 14 is disposed in such a manner as to be movable in the direction of the Z axis (i.e., the direction of the associated spindle), and the movement of the table 14 is controlled through a Z-axis feed screw 16 which can be driven by a servo-motor 15. A high-frequency motor 17 is fixed onto the table 14 in such a manner that the central axis of the motor 17 is aligned with the axis Z. The rotary shaft of the motor 17 is integral with one end of a wheel quill 18, and a wheel 19 is mounted on the other end of the quill 18.

Figure 6:
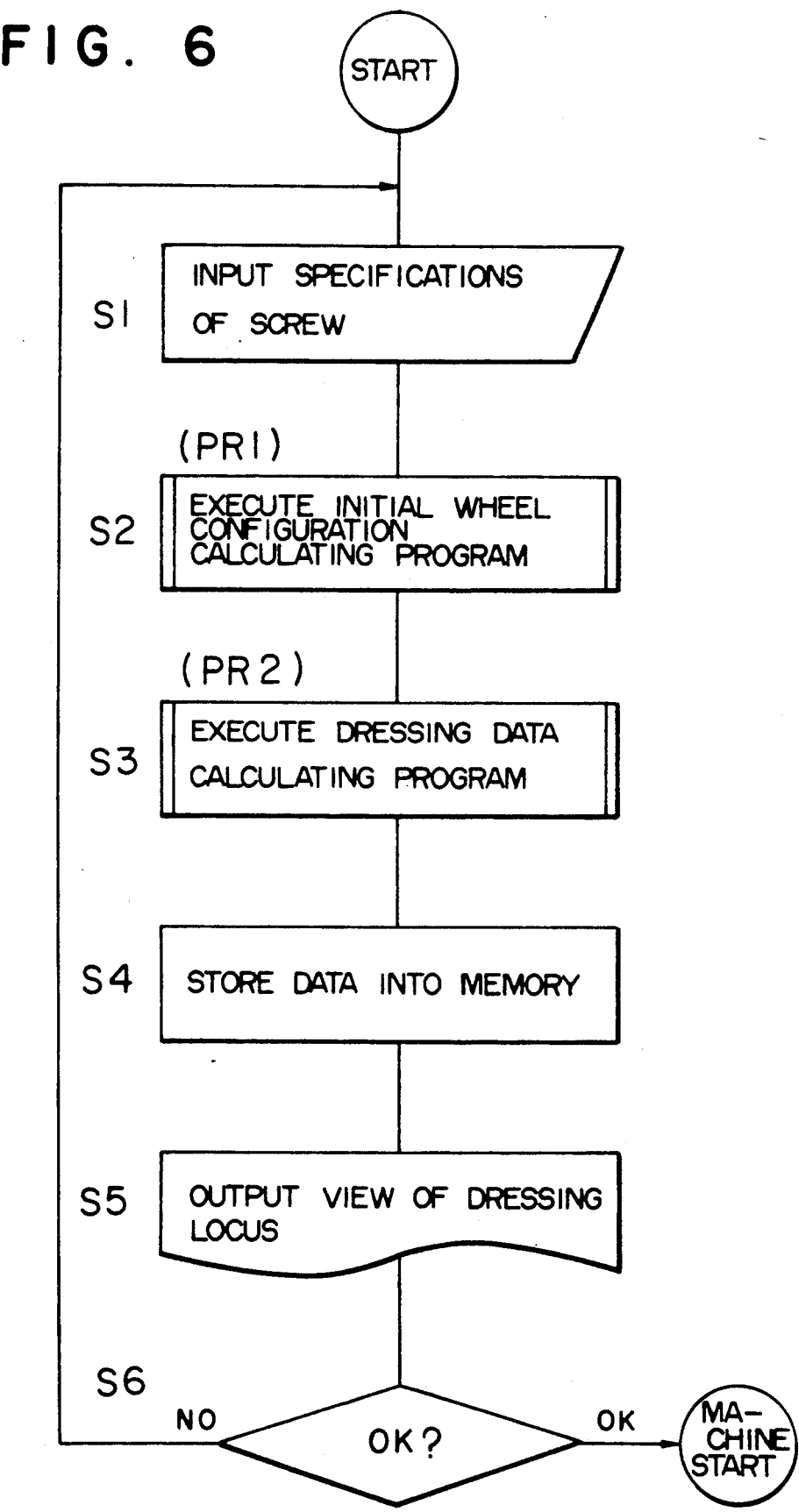
FIG. 6 is a flowchart showing a system program for dressing a wheel.
Figure 7A:
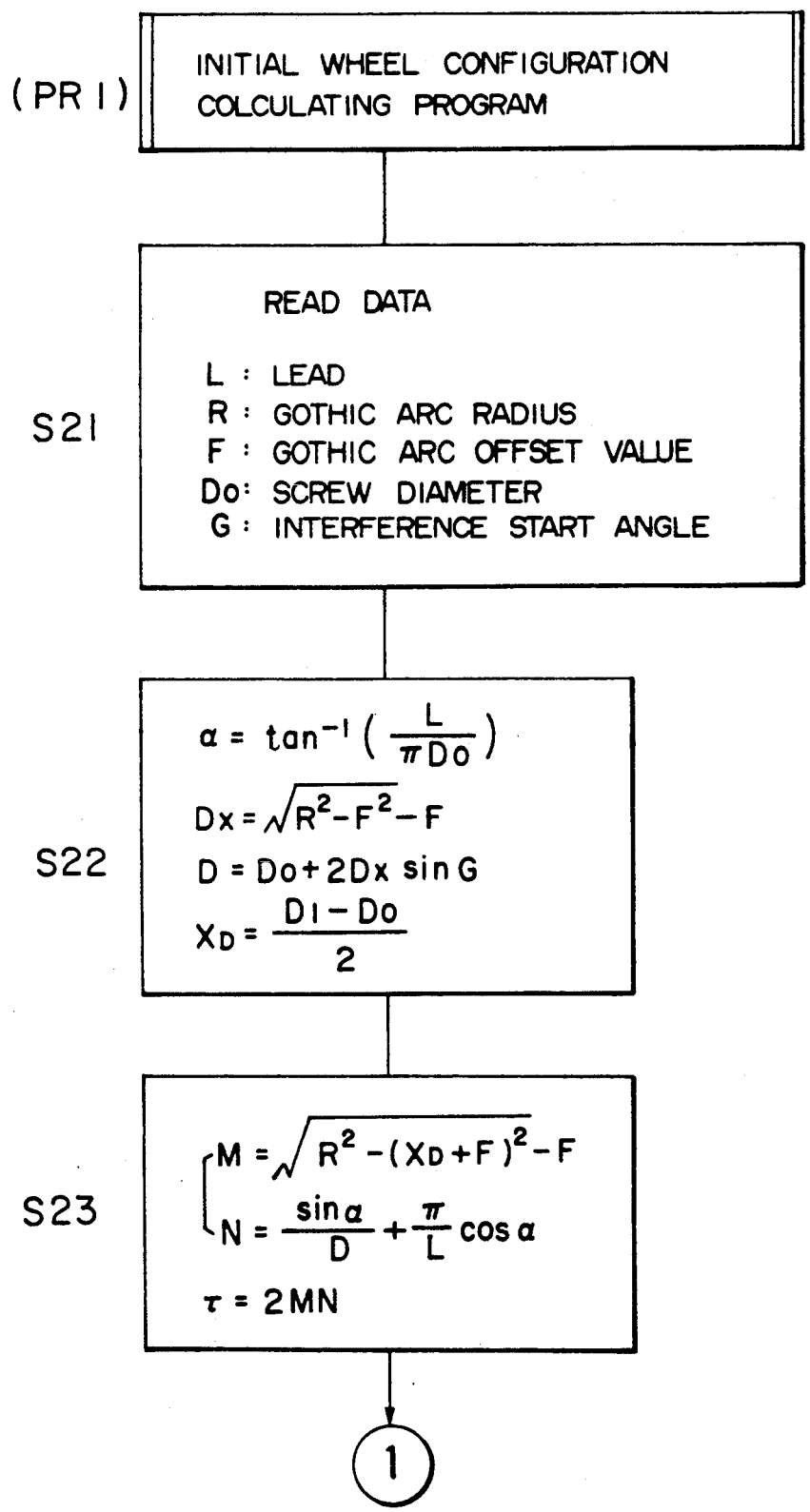
FIG. 7 is a flowchart showing a program for calculating the initial configuration of the wheel.
Figure 8C:
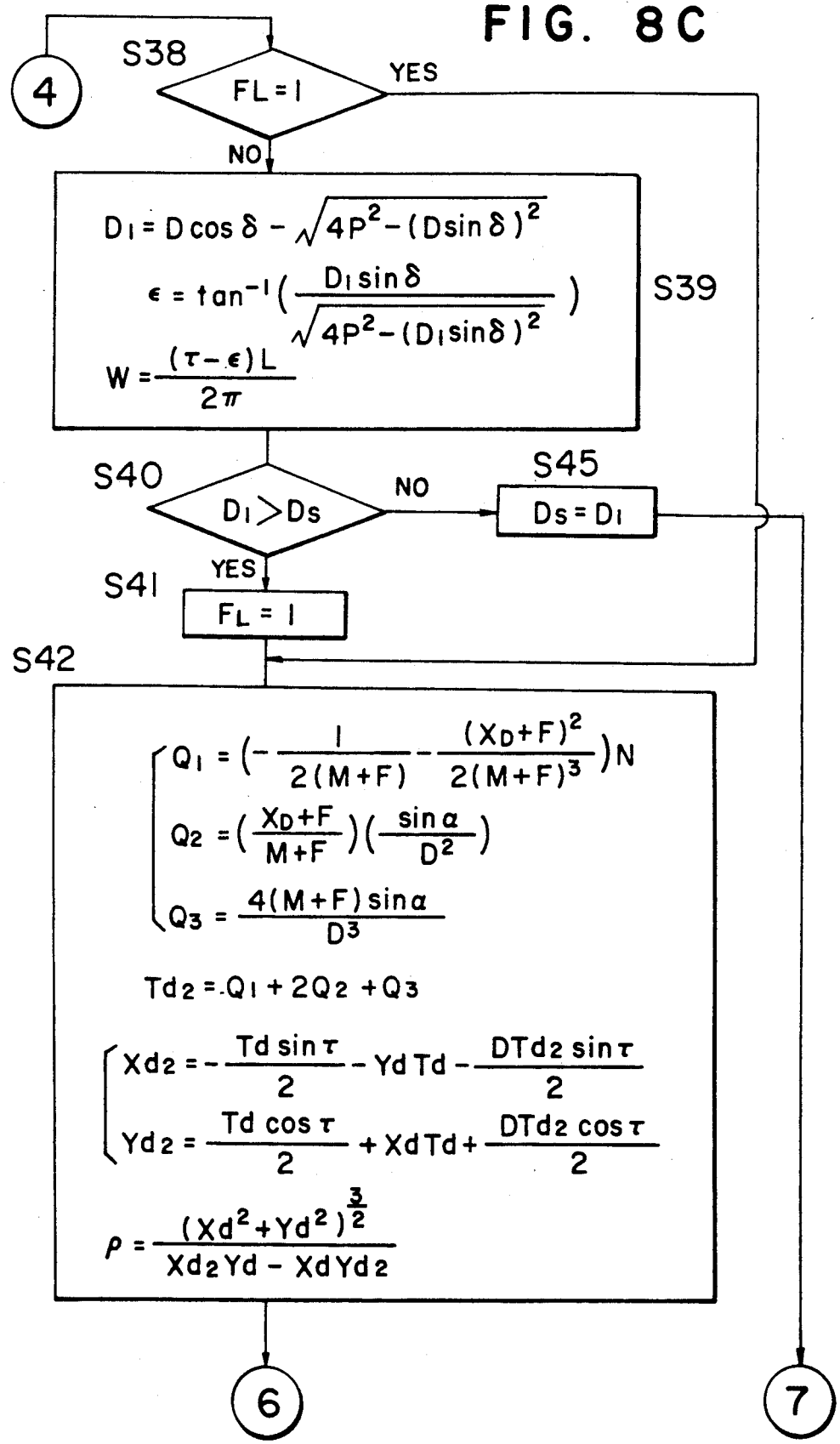
FIG. 8 is a flowchart showing a program for calculating dressing data.
Figure 8D:
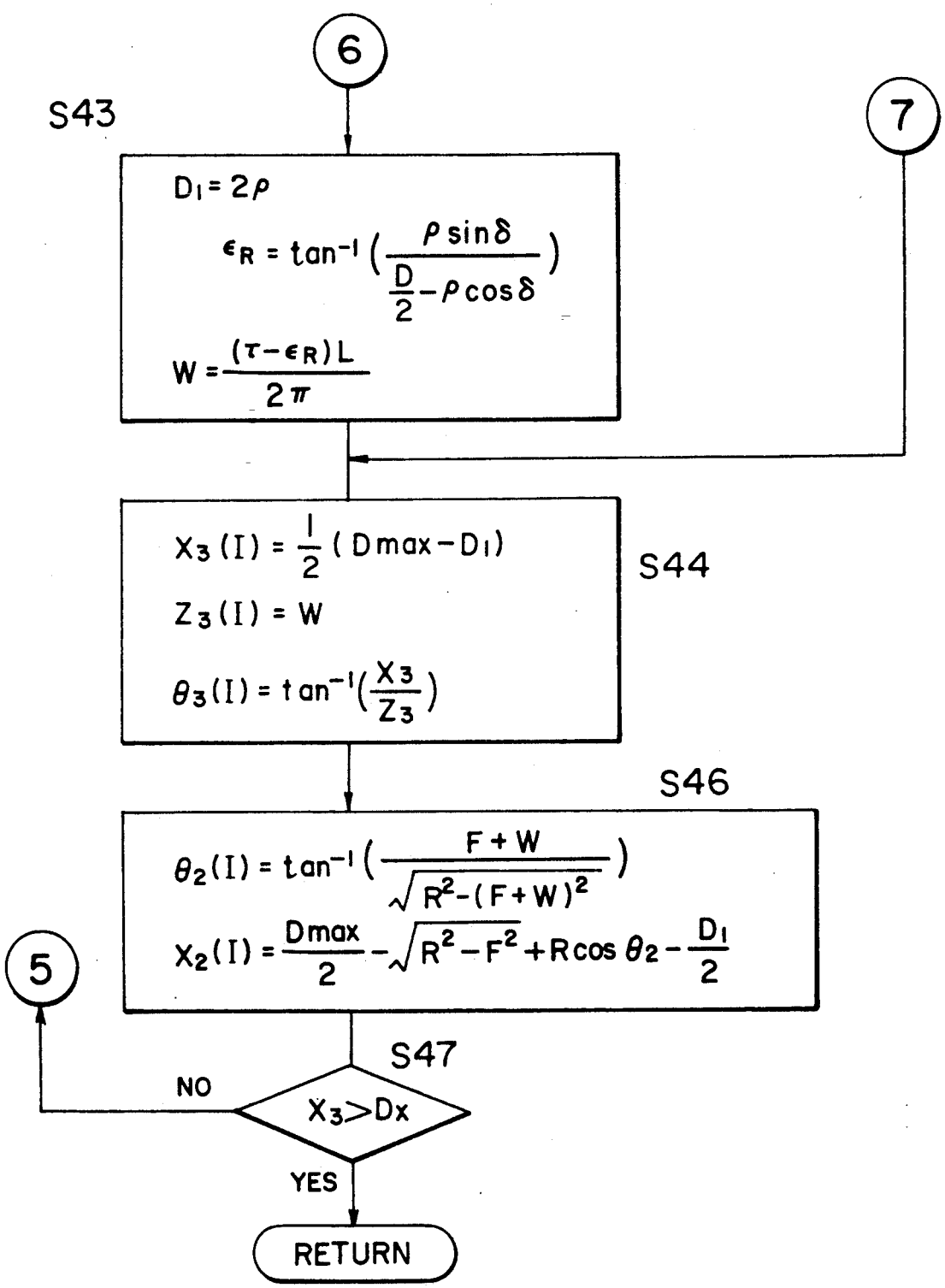

A system program for dressing the wheel will be described with reference to the flowcharts shown in FIGS. 6 to 8.

In Step S1, parameters for various specifications of a member included a screw-shaped portion, or a screw to be machined, such as the following are input: L: the lead of the screw; R: the radius of the Gothic arc; F: the Gothic arc offset value; $D_0$: the radius of the ball screw; and G: interference start angle.

In Step S2, a program PR1 for calculating the initial configuration of the wheel is executed. That is, in Step S21, the items of data on the parameters L, R, F, $D_0$, and G, which have been input in Step S1, are read.

In Step S22, the following calculation parameters are calculated.

The lead angle $\alpha$:

$$\alpha = \tan^{-1}\{L/(\pi D_0)\}$$

The distance $D_x$ from the center of the balls of the ball screw to the bottom of the screw:

$$D_x = \sqrt{R^2 - F^2} - F$$

The diameter D corresponding to the interference limit angle:

$$D = D_0 + 2D_x \sin G$$

The difference $X_D$ in radius between $D_1$ and $D_0$:

$$X_D = (D_1 - D_0)/2$$

In Step S23, in order to effect machining using an ordinary internal grinder, calculations are performed to obtain the thread-groove configuration on a section normal to the axis of the screw, so that the configuration of the wheel can be determined on the basis of the thread-groove configuration.

$$M = \sqrt{R^2 - (X_D + F)^2} - F$$

$$N = (\sin \alpha)/D + (\pi/L) \cos \alpha$$

$$\tau = 2 MN$$

From these calculations, coordinates (D, $\tau$) of the locus of the thread on a section normal to the axis of the screw are calculated. In these calculations, the value E shown in FIG. 5 is calculated referring to the relationship shown in FIGS. 4 and 5.

$$E = C_1 + C_2$$
$$C_1 = M \sin \alpha$$

-continued $$\begin{aligned} C_2 &= B/\tan \gamma \\ &= M \cos \alpha / \tan \{\tan^{-1}(L/\pi D)\} \\ &= \{(M\pi D)/L\} \cos \alpha \end{aligned}$$

$$\therefore E = M\{\sin \alpha + (\pi D/L) \cos \alpha\}$$

Figure 4:
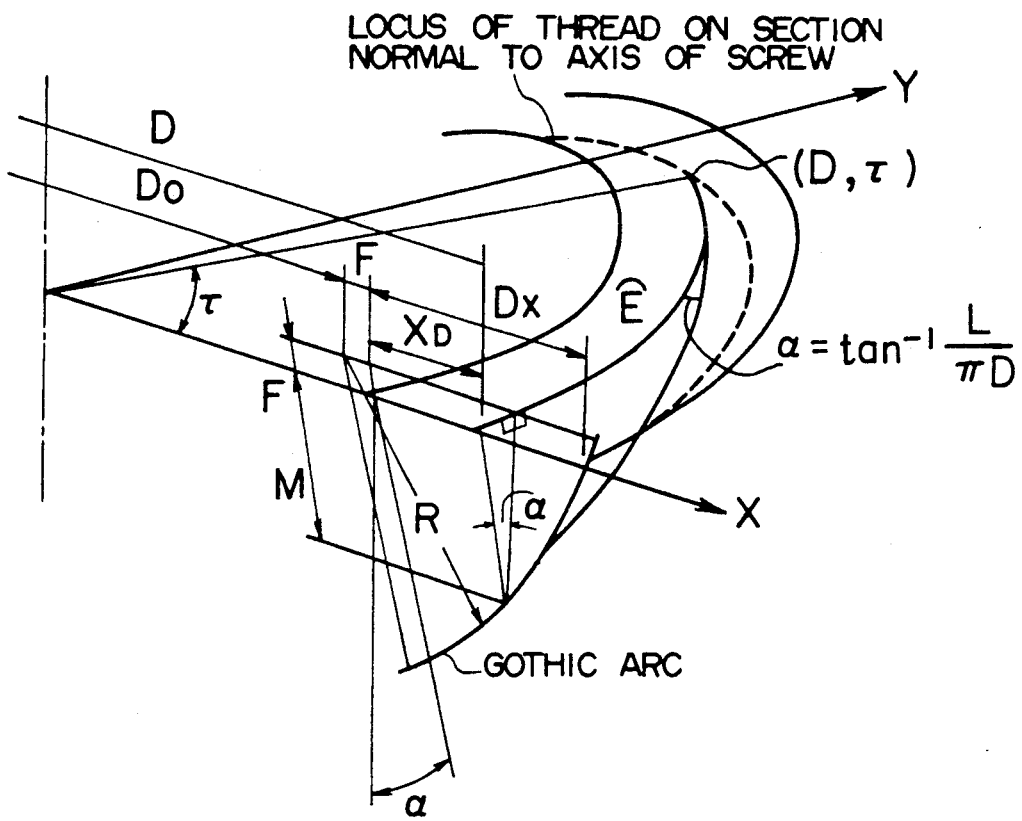
FIGS. 4 and 5 are views used to explain the polar coordinates of the locus of a thread on a section normal to the axis of the screw.
Figure 5:
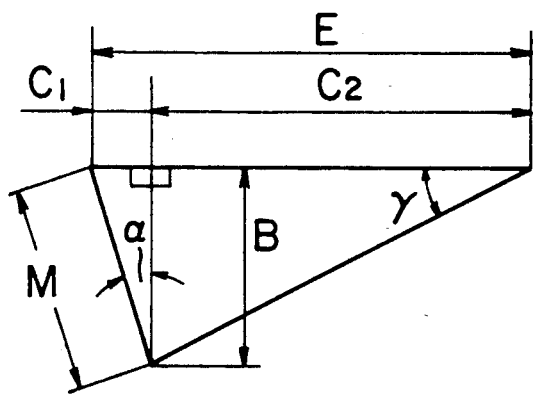

$\tau$ is calculated from the relationship shown in FIG. 4. Since E is an arc, $$\tau/(2\pi) = E/(\pi D)$$

$$\therefore \tau = 2E/D$$

When $$M = \sqrt{R^2 - (X_D + F)^2} - F \text{ and}$$

$$N = (\sin \alpha)/D + (\pi/L) \cos \alpha,$$

$$\tau = 2 M \{(\sin \alpha)/D + (\pi/L) \cos \alpha\}$$

$$= 2 MN$$

In Step S24, the radius $\rho$ of curvature at the coordinates (D, $\tau$) is calculated in the following manner.

$$T_d = -(2M \sin \alpha)/D^2 - \{(X_d + F)\}N/(M + F)$$

where $T_d = d\tau/d\theta$ $$X_d = \frac{1}{2}(\cos \tau - DT_d \sin \tau)$$

$$X_d = \frac{1}{2}(\sin \tau + DT_d \cos \tau)$$

where $$X_d = dX/dD, X = D/2 \cdot \cos \tau$$

$$Y_d = dY/dD, Y = D/2 \cdot \sin \tau$$

$$T_{d2} = d^2\tau/dD^2$$

On the other hand, $Q_1$, $Q_2$, and $Q_3$ are expressed as follows:

$$Q_1 = [-1/\{2(M+F)\} - (X_D+F)^2/\{2(M+F)^3\}] \cdot N$$

$$Q_2 = \{(X_D+F)/(M+F)\} \cdot (\sin \alpha)/D^2$$

$$Q_3 = \{4(M+F) \sin \alpha\}/D^3$$

$$T_{d2} = Q_1 + 2Q_2 + Q_3$$

$$X_{d2} = -(T_d \sin \tau)/2 - Y_d T_d - \sin \tau)/2$$

$$Y_{d2} = (T_d \cos \tau)/2 + X_d T_d + (DT_{d2} \cos \tau)/2$$

where $$X_{d2} = d^2X/dD^2$$

$$Y_{d2} = d^2Y/dD^2$$

$$\rho = (X_d^2 + Y_d^2)^{3/2}/(X_{d2}Y_d + X_d Y_{d2})$$

In Step S25, the initial diameter $D_{max}$ of the wheel and the initial width $W_{max}$ of the wheel are calculated in the following manner.

The tangential angle $K_T$ of the locus of the thread on the section normal to the axis of the screw is expressed as follows:

$$K_T = \tan^{-1}\{-(X_d/Y_d)\}$$

where $K_T \geq 0$ $$K_T = \tan^{-1}\{-(X_d/Y_d)\} + \pi$$

where $K_T < 0$

The angle $\delta$ to be formed by a line from the center of the work to (D, $\tau$) and another line from the center of the wheel to (D, $\tau$) is $$\delta = K_T - \tau$$

The distance P between the center of the work and the center of the wheel is $$P = \sqrt{(\rho \sin \delta)^2 + (D/2 - \rho \cos \delta)^2}$$

The initial wheel diameter $D_{max}$ and the initial wheel width $W_{max}$ are expressed as the following:

$$D_{max} = D_0 + 2(D_x - P)$$

$$W_{max} = 2D_x$$

In Step S26,
$D_{max}$ = initial wheel diameter
$W_{max}$ = initial wheel width
are output to a CRT to be displayed thereby. The operator views the output values, and he sets on the grinder a wheel having these dimensions. When this outputting and display has been completed, the execution of the subroutine PR1 is terminated. The program returns to S3 where a program PR2 for calculating dressing data is executed.

That is, in Step S31, the data on L, R, F, $D_0$ and $D_{max}$ which have been input in Step S1 are read.

In Step S32, various calculation parameters are calculated from the following equations:

$$\alpha = \tan^{-1}\{L/(\pi D_0)\}$$

$$D_x = \sqrt{R^2 - F^2} - F$$

$$P = D_0/2 + D_x - D_{max}/2$$

In step S33, initial set data are set in the following manner.

The number J of points to be calculated on the dressing locus:

$$J = 180$$

The variable $D_s$ to be compared with $D_1$:

$$D_s = 10000$$

In Step S34, the following declaration of arrays is made.

During biaxial control (using the dresser rotational angle $\theta_2$, and $X_2$):

$\theta_2(J)$, and $X_2(J)$

During triaxial control (using the dresser rotational angle $\theta_3$, $X_3$, and $Z_3$):

$\theta_3(J)$, $X_3(J)$, and $Z_3(J)$

In Step S35, calculations are to be repeated J+1 times from I=0 to I=J.

In Step S36, coordinates (D, $\tau$) of the locus of the thread on a section normal to the axis of the screw are calculated in a manner similar to that in Step S23, using the following equations:

$$D = D + 2D_x \cos\{(\pi I)/(2J)\}$$
$$X_D = (1/2)(D - D_0)$$

$$M = \sqrt{R^2 - (X_D + F)^2} - F$$

$$N = (\sin \alpha)/D + (\pi/L) \cos \alpha$$
$$\tau = 2MN$$

In Step S37, the angle $\delta$ to be formed by a line from the center of the work to (D, $\tau$) and another line from the center of the wheel to (D, $\tau$) is calculated using the following equations:

$$T_d = -\{(2M \sin \alpha)/D^2\} - (X_D + F)N/(M + F)$$

$$X_d = (\tfrac{1}{2})(\cos \tau - DT_d \sin \tau)$$

$$Y_d = (\tfrac{1}{2})(\sin \tau + DT_d \cos \tau)$$

$$K_T = \tan^{-1}\{-(X_d/Y_d)\}$$

where $K_T \geq 0$ $$K_T = \tan^{-1}\{-(X_d/Y_d)\} + \tau$$

where
$K_T < 0$ $$\delta = K_T - \tau$$

In Step S38, a determination is made as to whether a switching flag $F_L$ is equal to 1 (i.e., $F_L = 1$) so as to determine whether or not a set of calculations formulas are to be changed. Between the points (a) and (b) shown in FIG. 9, $F_L = 0$, whereas between the points (b) and (c), $F_L = 1$.

If the answer is NO, Step S39 is executed where coordinates on the contour of the wheel between the points (a) and (b) are calculated using the following equations:

$$D_1 = D \cos \delta - \sqrt{4P^2 - (D \sin \delta)^2}$$

$$\epsilon = \tan^{-1}\{(D_1 \sin \delta)/\sqrt{4P^2 - (D_1 \sin \delta)^2}\}$$

$$W = (\tau - \epsilon) \cdot L/2\pi$$

Figure 9:
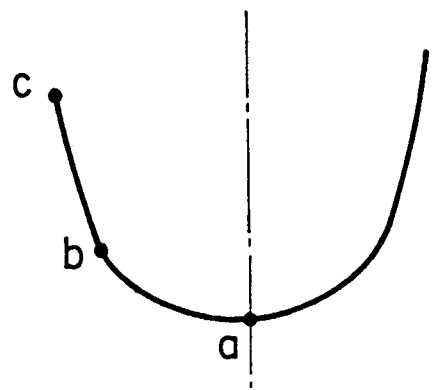
FIG. 9 is a view showing the contour of the wheel.
Figure 10:
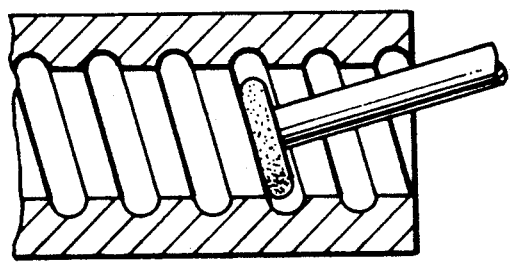
FIG. 10 is a view used to explain a state in which a female screw-shaped portion is ground by a conventional method.

The point (b) is the point at which the diameter $D_1$ of the wheel is the minimum in the equations between the points (a) and (b) in FIG. 9.

In Step S40, it is determined whether or not $D_1 > D_s$ stands. If the answer is YES, the flag $F_L$ is set to 1 in Step S41, then the next step S42 is executed. The execution of Step S42 follows the determination of Step S38 if the answer to the question of S38 is YES.

In Step S42, the radius $\rho$ of curvature at the coordinates (D, $\tau$) is calculated using the following equations:

$$Q_1 = [-1/\{2(M+F)\} - (X_D+F)^2/\{2(M+F)^3\}] \cdot N$$

$$Q_2 = \{(X_D+F)/(M+F)\} \cdot (\sin \alpha)/D^2$$

$$Q_3 = \{4(M+F) \sin \alpha\}/D^3$$

$$T_{d2} = Q_1 + 2Q_2 + Q_3$$

$$X_{d2} = -(T_d \sin \tau)/2 - Y_d T_d - (DT_{d2} \sin \tau)2$$

$$Y_{d2} = (T_d \cos \tau)/2 + X_d T_d + (DT_{d2} \cos \tau)/2$$

$$\rho = (X_d^2 + Y_d^2)^{3/2}/(X_{d2} Y_d - X_d Y_{d2})$$

In Step S43, coordinates on the contour of the wheel between the points (b) and (c) in FIG. 9 are calculated using the following equations:

$$D_1 = 2\rho$$

$$\epsilon_R = \tan^{-1} \cdot \{(\rho \sin \delta)/\{(D/2) - \rho \cos \delta\}\}$$

$$W = (\tau - \epsilon_R)L/2\pi$$

This calculation is followed by the execution of Step S44.

If the answer to the question of Step S40 is NO, Step 45 is executed where $D_s = D_1$, and this is followed by the execution of Step S44.

In Step S44, coordinates for triaxial control are calculated in the following manner.

$$X_3 (I) = \tfrac{1}{2} \cdot (D_{max} - D_1)$$

$$Z_3 (I) = W$$

$$\theta_3 (I) = \tan^{-1} (X_3/Z_3)$$

In Step S46, coordinates for biaxial control are calculated in the following manner.

$$\theta_2 (I) = \tan^{-1} \{(F + W)/\sqrt{R^2 - (F + W)^2}\}$$

$$X_2 (I) = D_{max}/2 - \sqrt{R^2 - F^2} + R \cos \theta_2 - D_1/2$$

In Step S47, a determination is made as to whether or not $X_3 > D_x$. If the answer is NO, I is set to I+1 (I=I+1). Then, the program returns to Step S35. On the other hand, if the answer is YES, it is determined that the point (c) has been reached. This is followed by the termination of the execution of the subroutine PR2, then returning to Step S4.

In Step S4, the thus calculated data is stored into a memory. For biaxial control, the dresser rotational angle data $\theta_2$ and the X-axis data $X_2$ are stored. For triaxial control, the X-axis data $X_3$, the Z-axis data $Z_3$, and the dresser rotational angle data $\theta_3$ are stored.

In Step S5, a view of a locus for dressing is output to the display.

In Step S6, the operator observes the view of the locus displayed on the CRT, and checks to see if the locus is correct. If the locus is determined to be correct, a wheel dressing operation is started. If the answer to the Step S6 is NO, the program returns to Step S1, and Steps S1 et seq. are repeated.

According to the present invention, since the configuration of the wheel is dressed in the manner described above, feeding for cutting can be achieved while the axis of the wheel extends in parallel with the axis of the screw. This enables the machining of the lead of a small-diameter, deep-grooved female screw. Furthermore, since a mechanism for tilting the wheel is unnecessary, the entire structure of the machine is rendered simple. In addition, an ordinary NC machine tool can be used to machine leads of screws simply by making changes in the NC program.

What is claimed is:

1. A method of machining a member, said method using an apparatus having a first position for dressing a grindstone having a rotational axis, and having a second position for machining said member, said member including a screw-shaped portion, comprising the steps of:

moving said grindstone to said first position;

dressing said grindstone with a single point dresser operated by a NC controlling apparatus so that said grindstone has a projecting profile adapted to produce a predetermined thread-groove configuration intended for said screw-shaped portion of the member to be machined, said configuration being on a section normal to the axis of the screw-shaped portion;

moving said grindstone to said second position;

positioning the rotational axis of said grindstone in parallel with the axis of said screw-shaped portion to be machined; and grinding the relevant surface of said screw-shaped portion by moving said grindstone relative to said screw-shaped portion while the rotational axis of said grindstone is maintained parallel with the axis of said screw-shaped portion of the member.

2. A method according to claim 1, wherein the step of dressing the grindstone further includes the steps of:

inputting, to a means for computing, data of the predetermined thread-groove configuration of said screw-shaped portion of the member to be machined;

automatically calculating, with said computing means, using said inputted data, a projecting-profile for the grindstone for machining the screw-shaped portion of the member to the intended thread-groove configuration; and automatically shaping said grindstone with a single point dresser to the contours of said projecting profile calculated from said inputted data.

3. A method according to claim 2 and further comprising between the steps of automatically calculating and automatically shaping, the step of:

outputting to a display a view of a calculated locus of said dresser for dressing said grindstone for comparison with a desired locus.

* * * * *